United States Patent
Moradmand

[19]

[11] Patent Number: 5,921,360
[45] Date of Patent: Jul. 13, 1999

[54] DIGRESSIVE DAMPER VALVE

[75] Inventor: Jamshid Kargar Moradmand, Dayton, Ohio

[73] Assignee: General Motors Corporation, Detroit, Minn.

[21] Appl. No.: 08/869,354

[22] Filed: Jun. 5, 1997

[51] Int. Cl.$^6$ .................................................. F16F 9/00
[52] U.S. Cl. ................................. 188/322.22; 188/283
[58] Field of Search ........................... 188/282.1, 282.5, 188/282.6, 282.8, 282.9, 283, 283.1, 322.15, 322.22

[56] References Cited

U.S. PATENT DOCUMENTS

| | | | |
|---|---|---|---|
| 2,717,058 | 9/1955 | Brundrett | 188/322.15 X |
| 3,062,331 | 11/1962 | Wyman | 188/88 |
| 3,889,787 | 6/1975 | Zehring et al. | 188/317 |
| 3,945,474 | 3/1976 | Palmer | 188/322.15 |
| 4,401,196 | 8/1983 | Grundei | 188/322.15 X |
| 4,610,332 | 9/1986 | Mourray | 188/322.15 |
| 4,646,883 | 3/1987 | Tanaka | 188/322.22 X |
| 4,768,629 | 9/1988 | Wossner | 188/284 |
| 4,775,038 | 10/1988 | Unnikrishnan et al. | 188/322.15 X |
| 4,809,829 | 3/1989 | Hummel et al. | 188/322.15 |
| 4,964,493 | 10/1990 | Yamaura et al. | 188/282.6 |
| 4,971,181 | 11/1990 | Zaenglein et al. | 188/322.15 |
| 5,577,579 | 11/1996 | Derr | 188/315 |
| 5,738,190 | 4/1998 | Deferme | 188/322.15 X |

FOREIGN PATENT DOCUMENTS

| | | | |
|---|---|---|---|
| 270932 | 11/1988 | Japan | 188/322.22 |
| 2234038 | 1/1991 | United Kingdom | 188/322.22 |

OTHER PUBLICATIONS

Article, Automotive Industries, p. 74, Mar. 1997.

*Primary Examiner*—Robert J. Oberleitner
*Assistant Examiner*—Pamela J. Lipka
*Attorney, Agent, or Firm*—Jeffrey A. Sedler; Robert M. Sigler

[57] ABSTRACT

A digressive valve for a vehicle damper provides rebound performance with a relatively high damping rate for low velocity inputs and a relatively low flow restriction operation for high velocity inputs so that a relatively firm ride with reduced impact harshness is achieved. A piston has a set of compression openings and a set of rebound openings extending through the piston from one surface, to another surface having a cavity, with an annular seat formed in the cavity. A compression valve is positioned adjacent the piston and normally substantially closes the set of compression orifices. During compression, fluid flow out from the set of compression orifices is restricted by the compression valve. Positioned in the cavity is a rebound valve with a blow-off valve having an annular surface that tightly seals against the annular seat. A spring is biased against the blow-off valve, forcing the annular surface against the annular seat under a preload. During rebound, fluid flow out from the set of rebound openings is restricted by the blow-off valve, wherein the annular surface and annular seat permit substantially no leakage therebetween so that the spring must be compressed to move the blow-off valve off the annular seat to allow fluid flow through the set of rebound openings, providing a firm ride under low velocity input conditions wherein the preload must be surpassed to move the blow-off valve and wherein high velocity inputs move the blow-off valve to compress the spring resulting in substantially no flow restriction so that the effects of large, high velocity inducing impacts are minimized.

14 Claims, 8 Drawing Sheets

FIG. 10

DIGRESSIVE DAMPER VALVE

TECHNICAL FIELD

The invention relates to a digressive damper valve and more particularly, to a blow-off valve for a vehicle damper providing rebound performance with a relatively high damper rate at low velocity inputs and providing relatively low flow restriction operation at high velocity inputs in a digressive performance manner, so that high handling control is achieved without compromising impact harshness.

BACKGROUND OF THE INVENTION

The typical hydraulic damper used in vehicle suspensions dissipates energy and filters out road inputs from being transferred to the vehicle body and the associated passenger compartment. These dampers have proven particularly successful in operation and therefore, have remained a staple automotive component for many years. Hydraulic dampers typically include a piston that is movable within a fluid carrying cylinder, wherein movement of the vehicle suspension is restrained by requiring fluid to flow through the piston to permit relative movement to occur. The piston assembly itself generally carries a compression and a rebound valve assembly to provide a different level of fluid flow restriction for each of the two operational movement directions.

Two of the most common types of valves used in damper pistons are deflected-disk type valves and blow-off type valves. With a deflected disk valve, a disk stack is positioned as an obstruction in a fluid flow path through the piston. During piston movement, once sufficient pressure is developed the disk stack is deflected to provide an increased flow area. The extent to which the disk stack resists deflection assists in determining the damping characteristics of the pistons. A great deal of load tuning flexibility is provided by varying the number, diameter and thickness of the disks in the stack. With a blow-off valve a single disk is generally biased by a spring to normally close-off fluid flow passages through the piston. Sufficient fluid pressure causes the disk to lift, compressing the spring and providing an increased fluid flow area. Different rate springs and preloads allow the valve to blow-off at different pressures thereby regulating damping loads.

The shape of a load versus velocity performance curve for a damper employing either a deflected disk or a blow-off valve is determined by the individual characteristics of the valves. The performance curves have a significant affect on the ride and handling quality of a damper for a given vehicle. Dampers are tuned for individual vehicle platforms to achieve a desirable performance as measured by corresponding vehicle body motions, wheel control, and impact isolation, among other factors. Dampers are typically tuned by changing the piston valve and base valve components. Accordingly, with any specific valve design, a means for tuning the valving for each application must generally be provided. In general, deflected disk valves result in a more progressive performance curve than blow-off valves. Some applications may require a greater extent of digressivity than has previously been provided. Accordingly, even though deflected disks and blow-off type valves have long been known in the vehicle damper art, new applications require new structural features to provide performance characteristics for specific damper responses.

SUMMARY OF THE INVENTION

An aspect of the present invention resides in providing a digressive damper valve which provides a very steep, low speed performance curve with a nearly flat performance curve thereafter. This type of performance can be described as a pure blow-off response. In other words, at low velocity inputs high damping force controls ride motions so that a firm handling characteristic results for the associated vehicle. Sudden impacts resulting from drastically uneven road surfaces effect high velocities that activate the blow-off mechanism reducing damping action to eliminate harshness.

According to this aspect, a digressive damper valve for a vehicle damper includes a piston having a cavity formed in one of its sides, with a set of compression openings and a set of rebound openings extending through the piston to the cavity. A compression valve is positioned adjacent the piston on the side opposite the cavity and normally closes the set of compression orifices such that during compression directed travel of the piston fluid flow out from the set of compression orifices is restricted by the compression valve. A rebound valve is positioned on the opposite side of the piston from the compression valve within the cavity and includes a blow-off valve having an annular surface that tightly seals against an annular seat. The blow-off valve includes an outer peripheral surface that engages the piston within the cavity maintaining the blow-off valve in a substantially centered position. A spring biases the blow-off valve against the annular seat so that fluid flow out from the set of rebound openings is restricted by the blow-off valve. The blow-off valve preferably engages the annular seat in a manner that permits substantially no leakage therebetween so that the spring must be compressed to move the blow-off valve off the annular seat allowing fluid flow through the rebound opening. This provides a firm ride under low velocity input conditions. A significant preload is imparted by the spring which must be surpassed to move the blow-off valve significantly, such that high velocity inputs move the blow-off valve resulting in substantially no flow restriction effect from the blow-off valve so that the consequences of large high velocity inducing impacts are minimized.

According to a preferred aspect of the present invention, the annular seat is formed by the piston with the set of rebound openings extending through the piston radially inside the annular seat. The piston also includes a piston hub formed radially inside the set of rebound openings with a relatively large contact area. The blow-off valve includes an inner annular surface that mates with the piston hub radially inside the set of rebound openings and includes an outer annular surface that mates with the annular seat radially outside the set of rebound openings. The blow-off valve further includes a central surface located between the inner and outer annular surfaces that forms an annular trough in the blow-off valve. The piston may also include a plurality of axially directed guides projecting into the cavity and engaging the outer periphery surface of the blow-off valve, maintaining the blow-off valve in a substantially centered position.

According to another preferred aspect of the present invention, the annular seat is formed by the piston at a radially outside position and by a disk at a radially inside position. The disk has an outside diameter that terminates radially inside the set of rebound openings. The blow-off valve includes an inner annular surface that mates with the disk radially inside the set of rebound openings and includes an outer annular surface that mates with the annular seat radially outside the set of rebound openings. Low velocity tuning is provided by permitting a selected amount of leakage between the disk and the inner annular surface without compressing the spring. This is achieved through a series of orifices formed in the disk.

According to another preferred aspect of the present invention, the blow-off valve includes an axially directed cylindrical leg with a first terminal end and a second terminal end. The blow-off valve includes a radially directed annular leg that extends from the cylindrical leg between the first and second terminal ends. The piston includes an annular trough inside the cavity that registers with the set of rebound openings. The first terminal end of the blow-off valve seats against the piston inside the annular trough and the annular leg seats against the annular seat of the piston. The blow-off valve may carry an annular resilient seat against the annular leg and adjacent the first terminal end of the cylindrical leg so that the seal is also engageable with the piston inside the annular trough. As a further option, any of the previously described blow-off valves may include a series of radially outwardly extending guides that project into the cavity and engage the piston. The guides help in maintaining the blow-off valve in a substantially centered positioned.

DESCRIPTION OF THE PREFERRED EMBODIMENT

Figure 1:
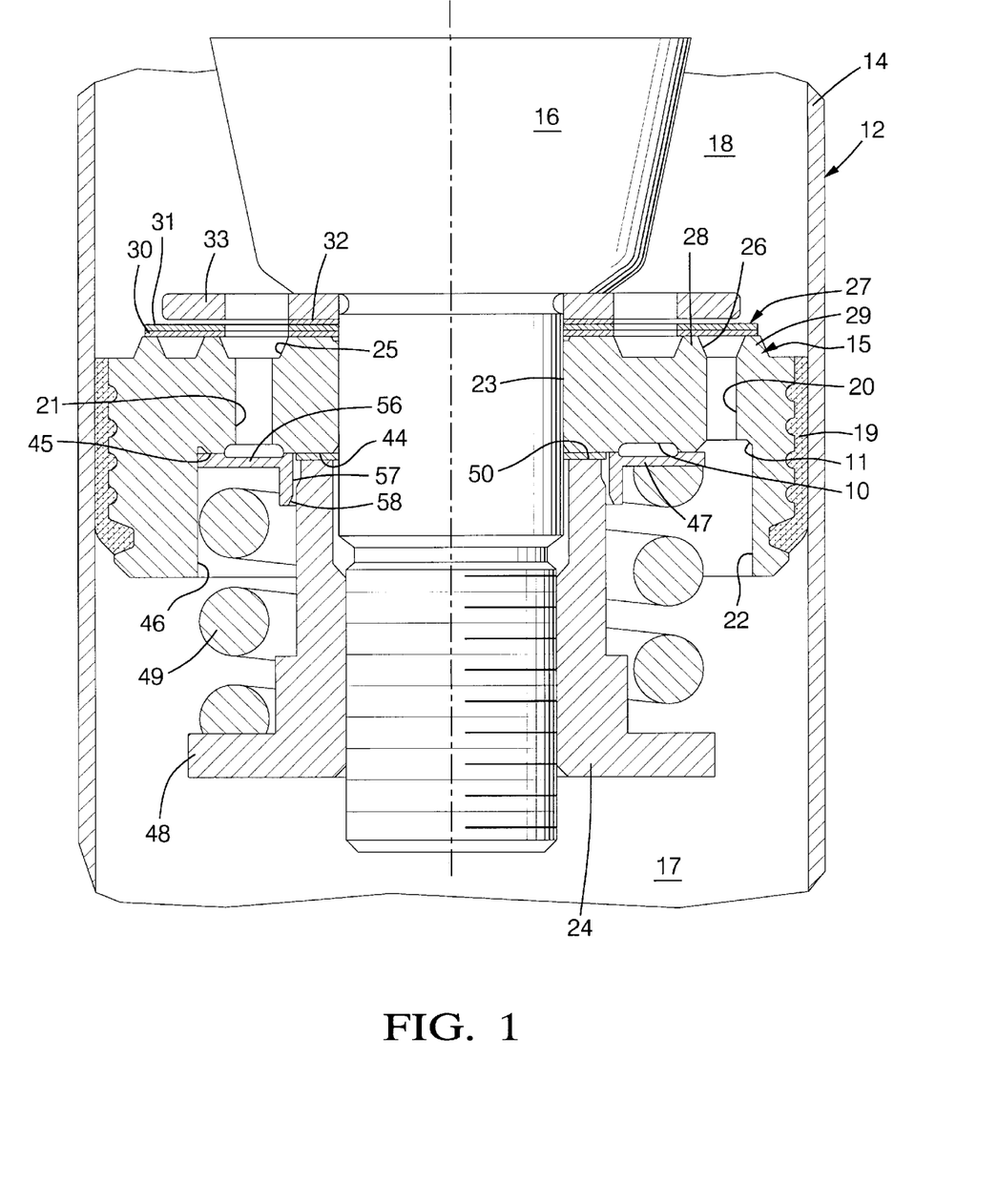
FIG. 1 is a cross-sectional illustration of a digressive damper valve according to the present invention.

Referring to the drawings, illustrated in FIG. 1 is a damper 12 that includes a cylinder tube 14 carrying a quantity of fluid (not shown). The cylinder tube 14 may be positioned in a corresponding reservoir tube (not illustrated), as is commonly known in the art. The damper 12 includes a piston 15 that is slidably positioned in the cylinder tube 14 for bi-directional movement therein. The piston 15 is carried by a piston rod 16. The piston rod 16 is generally adapted for connection to the sprung mass (body) of an associated vehicle, and the cylinder tube 14 or corresponding reservoir tube is adapted for connection to the unsprung mass (wheel assembly), in a manner that is well-known in the art. As the wheel assembly travels along any given roadway surface, discontinuities therein result in relative movement between the wheel assembly and the body that results in sliding action of the piston 15 within the cylinder tube 14.

Figures 3, 4:
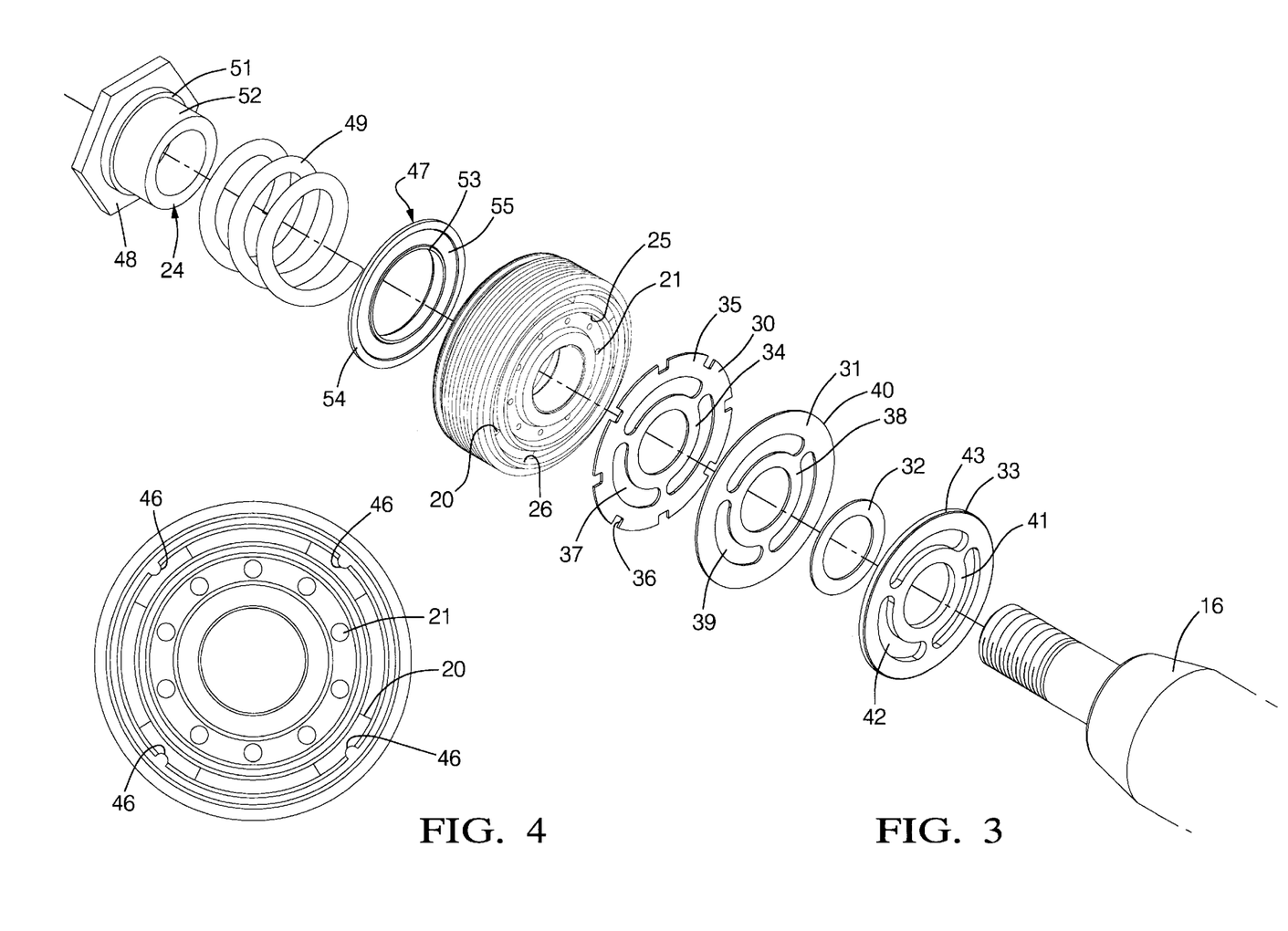
FIG. 3 is a partially exploded perspective view of the digressive damper valve of FIG. 1.
FIG. 4 is a detailed illustration of the piston of the digressive damper valve of FIG. 1.

The cylinder tube 14 carries the quantity of fluid in the compression chamber 17 and the rebound chamber 18. The piston 15 carries a band of durable low friction material 19 that sealingly bears against the cylinder tube 14 substantially ensuring that the movement of fluid between the compression chamber 17 and the rebound chamber 18 must pass through the piston 15 itself. Accordingly, the piston 15 includes a set of compression openings 20 that are provided in a circular pattern in the piston 15 and are provided in a curved elongated slot shape as seen in FIG. 4. The piston 15 also includes a set of rebound openings 21 that are also distributed in the piston 15 in a circular pattern and are formed in a circular shape as seen in FIG. 4. A cavity 22 is formed in the piston 15 on the compression chamber 17 side, with the set of compression openings 20 and the set of rebound openings 21 each opening to the cavity 22. A central opening 23 extends through the piston 15 and is received onto a turned-down section of the piston rod 16 that extends through the cavity 22 and into the compression chamber 17. A threaded section of the piston rod 16 engages a nut 24 that maintains the piston 15 on the piston rod 16.

The top of the piston 15 includes an annular trough 25 that registers with the set of rebound openings 21 and an annular trough 26 that registers with the set of compression openings 20. A deflected disk assembly 27 is positioned against the top of piston 15 and normally closes off the set of compression openings 20 by engaging the annular ribs 28 and 29. The deflected disk assembly 27 acts as a restriction to fluid flowing out from the set of compression openings 20 during compression directed travel of the piston 15. The deflected disk assembly includes an orifice disk 30, a second stage disk 31, a spacer 32 and retainer 33. The orifice disk 30 and second stage disk 31 are flexible, whereas the retainer 33 is substantially rigid.

The orifice disk 30, second stage disk 31, spacer 32 and retainer 33 are more clearly illustrated in FIG. 3 and accordingly, reference is directed thereto. The orifice disk 30 includes a central hub 34 that is received over the piston rod 16 and supports a peripheral section 35 that engages the annular ribs 28 and 29. The peripheral section 35 includes a plurality of orifices 36 that permit a prescribed rate of flow out from the set of compression openings 20 during compression directed travel, when the velocity of piston 15 is insufficient to deflect the disks 30 and 31. The orifice disk 30 also includes a substantially open area 37 that registers with the annular trough 25 and the set of rebound openings 21. Second stage disk 31 also includes a central hub 38, a substantially open area 39 and a peripheral section 40. The substantially open area 39 also registers with the annular trough 25 and the set of rebound openings 21. A spacer 32 that is about the size of the central hubs 37 and 38 is provided for positioning against the second stage disk 31 and the retainer 33 is provided for positioning against the spacer 32. The retainer 33 includes a central hub 41, a substantially open area 42 that registers with the annular trough 25, the set of rebound openings 21 and a peripheral section 43. During compression directed travel of the piston 15, fluid moves from the compression chamber 17 into the cavity 22 through the set of compression openings 20 and into the annular trough 26. When movement of the piston 15 is below a certain velocity, the fluid moves through the orifices 36 and into the rebound chamber 18. When the velocity of the piston exceeds a certain selected limit that is determined both by the flexibility of the disks 30, 31 and the size of the orifices 26, the disks deflect upward providing a greater open flow area between the compression chamber 17 and the rebound chamber 18. The retainer 33 acts as a rigid limit that stops the deflection of the disks 30 and 31 at a selected point.

The bottom side of the piston 15, within the cavity 22, includes a pair of annular troughs 10 and 11 that register with the set of rebound openings 21 and the set of compression openings 20, respectively. The piston 15 also forms a rather large central hub area 44 and an annular seat 45. The central hub area 44 is positioned radially inside the set of rebound openings 21 and the annular seat 45 is positioned radially outside the set of rebound openings 21. Reference is directed to FIG. 4 where these features are also illustrated. As seen in FIG. 4, a set of four axially directed guides 46 are formed by the piston 15 and project into the cavity 22.

Referring again to FIG. 1 along with FIG. 3, the guides 46 maintain a blow-off valve 47 in a substantially centered position within the cavity 22, with a spring 49 compressed against shoulder 48 of nut 24 and against blow-off valve 47, thereby forcing blow-off valve 47 against the piston 15. The spring 49 exerts a preload force on the blow-off valve 47, the amount of which is determined by both the rate of the spring 49 and the thickness of the annular spacer 50 that is positioned between the nut 24 and piston 15. The amount of preload of the spring 49 determines or sets the blow-off point of the valve. Force produced by the fluid pressure acting on the valve overcomes the spring preload and deflects the valve. In the present embodiment, the spring 49 has a spring rate of approximately 45 Newtons/millimeter, and biases the blow-off valve against the piston 15 under a preload of over approximately 250 Newtons, and more specifically approximately 266 Newtons. As seen in FIG. 3, the shoulder 48 of nut 24 includes a hexagonal outer perimeter to facilitate torquing during damper assembly. An annular step 51 is positioned at the juncture between shoulder 48 and cylindrical section 52 of nut 24. The annular shoulder 51 maintains the spring 49 in a substantially centered positioned.

The blow-off valve 47 includes an inner annular surface 53 that mates with the central hub area 44 of the piston 15 radially inside the set of rebound openings 21. The blow-off valve 47 also includes an outer annular surface 54 that mates with the annular seat 45 of piston 15 radially outside the set of rebound openings 21. An annular trough 55 is formed between the inner annular surface 53 and the outer annular surface 54 and serves as a pressure pocket that assists in eliminating undesirable valve resonance conditions. The inner annular surface 53 and the outer annular surface 54 provide a closely toleranced flat mating surface, and also assist in sealing between the inner annular surface 53 and the central hub area 44 along with sealing between the outer annular surface 54 and the annular seat 45. The inner annular surface 53 and the outer annular surface 54 are formed in a radially directed leg 56 of the blow-off valve 47. Blow-off valve 47 also includes an axially directed leg 57 that fits over the cylindrical portion 52 of nut 24 and forms a tapered opening 58 avoiding any hindrance to even valve lift of the blow-off valve 47.

For rebound directed travel of the piston 15 within the cylinder tube 14, the fluid moves from the rebound chamber 18 through the substantially open areas 42, 39 and 37 and into the annular trough 25 and the set of rebound openings 21. At this point, fluid movement is restricted by the blow-off valve 47 which tightly seals against the piston 15 due to the close mating contact between the inner annular surface 53 and the central hub area 44, along with the close mating connection between the outer annular surface 54 and the annular seat 45. For low velocity movements of the piston 15, fluid force in the set of rebound openings 21 is insufficient to compress the spring 49 and move the blow-off valve 47 off its position on the piston 15. Accordingly, for these low velocity movements the desired performance is achieved through a parallel flow path through the piston 15. In the present embodiment that parallel flow path is provided through the orifices 36 of the orifice disk 30 and the set of compression openings 20. Accordingly, during low velocity movements of the piston 15 in a rebound direction, the damping rate is determined by the number and size of the orifices 36, with flow being directed between the rebound chamber 18 and the compression chamber 17 through the set of compression openings 20.

Figure 2:
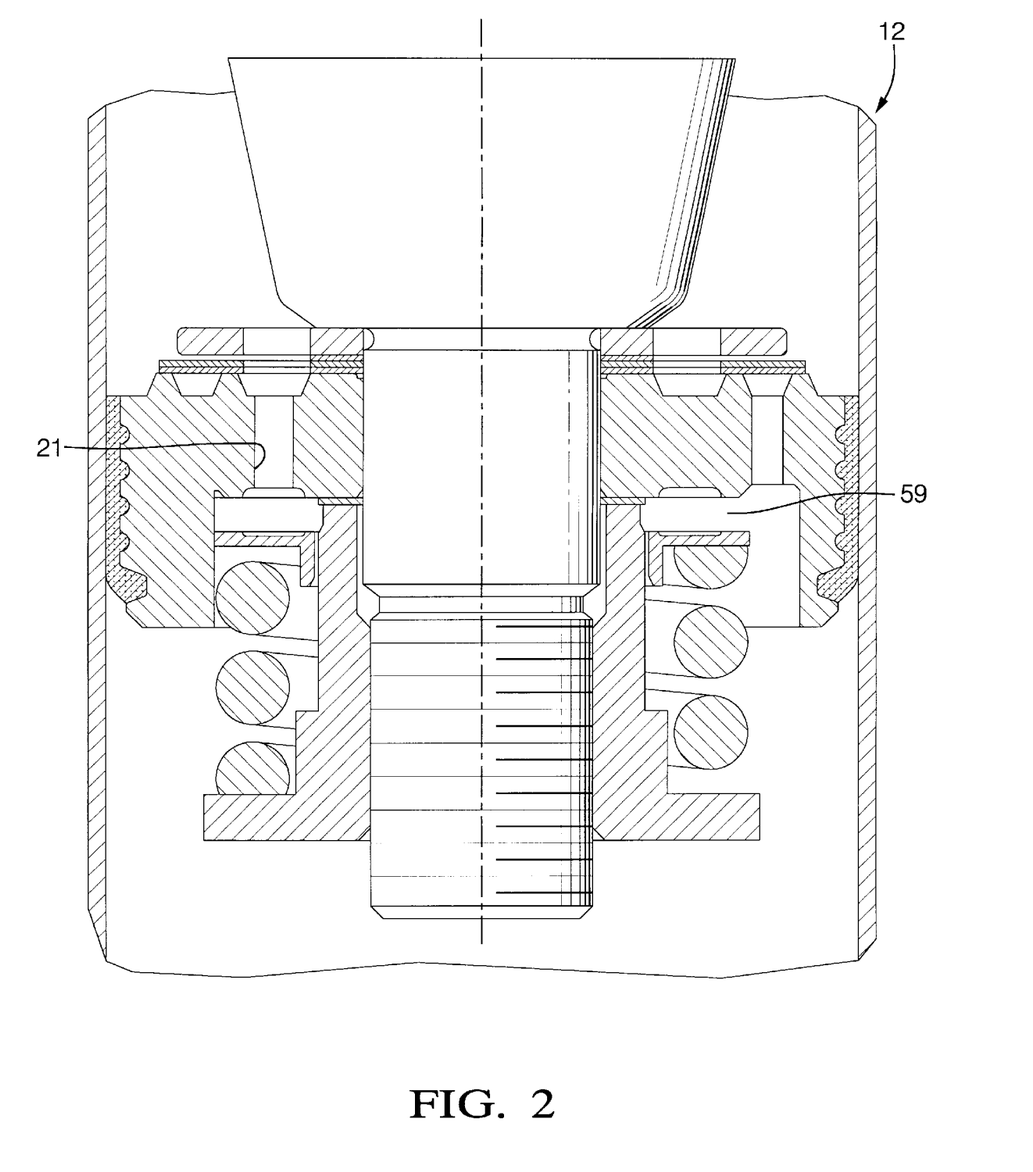
FIG. 2 is an illustration of the digressive damper valve of FIG. 1 shown in a blow-off condition.

Once the velocity of movement of the piston 15 creates a fluid pressure in the set of rebound openings 21 sufficient to unseat the blow-off valve 47, the spring 49 is compressed at least three millimeters as shown in FIG. 2, providing a substantial opening 59 for rebound fluid flow. When this occurs, the flow area provided by the number and size of the set of rebound openings 21 substantially determines the performance curve that results during rebound travel.

Figure 5:
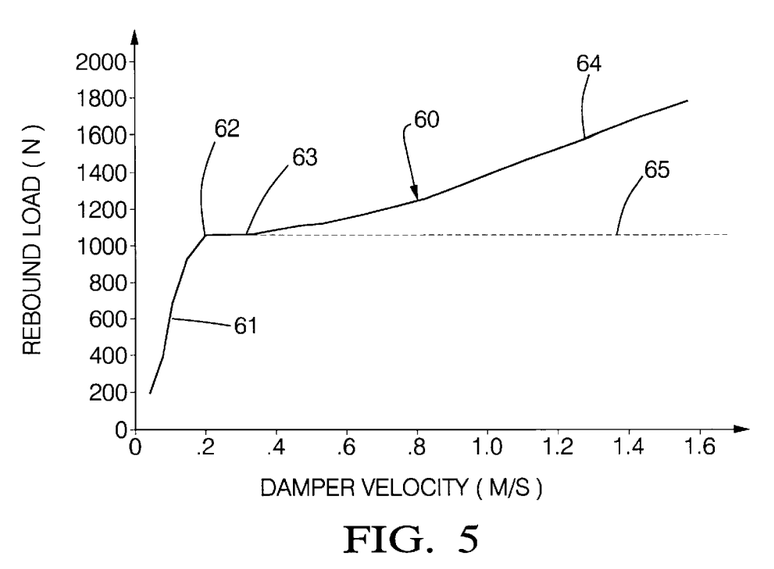
FIG. 5 is a performance curve of rebound load versus damper velocity for a digressive damper valve according to the present invention.
Figure 6:
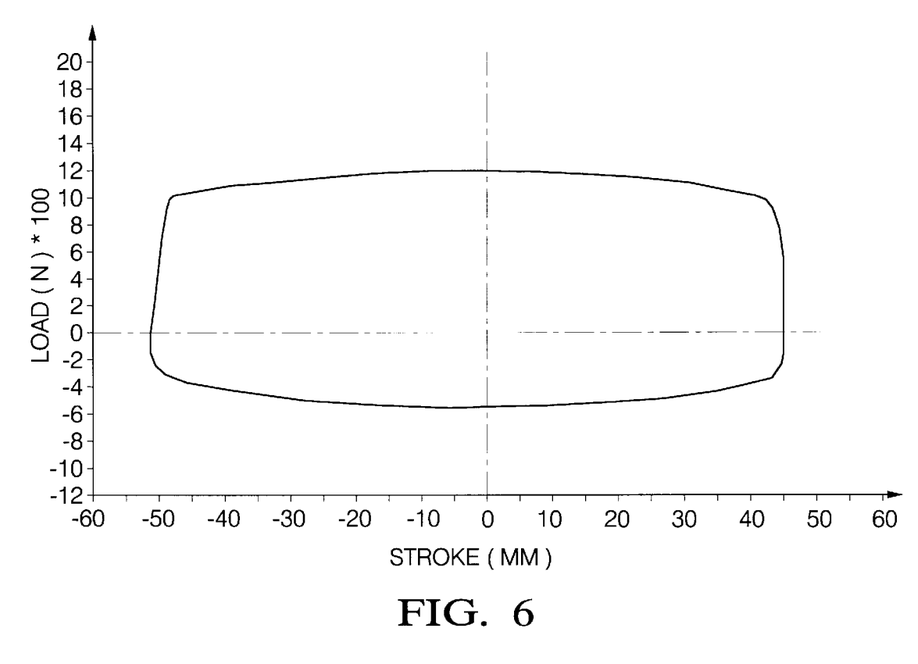
FIG. 6 is a performance curve of both rebound and compression load versus damper stroke for a digressive damper valve according to the present invention.

Referring to FIG. 5, the rebound load in Newtons, versus damper velocity in meters/second is graphed as performance curve 60. During low velocity rebound directed travel of the piston 15, the relatively steep curve segment 61 results. At point 62 on the performance curve 60, the preload of spring 49 is overcome and the blow-off valve 47 opens providing blow-off operation. After the blow-off point 62 a relatively flat segment 63 of the performance curve 60 results. By limiting the flow area of the set of rebound openings 21 the curve 60 again becomes slightly progressive in the higher velocity ranges at segment 64. Optionally, reducing any restriction by increasing the open flow area of the set of rebound openings 21 results in a substantially flat portion of the curve that extends out through the higher velocity ranges as indicated by optional segment 65. Referring to FIG. 6, a performance curve showing load versus stroke for an entire rebound and compression cycle of a damper according to the present invention is shown. The rebound load of the damper is charted on the positive side of the zero horizontal axis and the compression load is charted on the negative side of the zero horizontal axis. The total energy dissipated by the damper equals the area of the load versus displacement. The damper provides a desirable substantially square plot.

Figure 7:
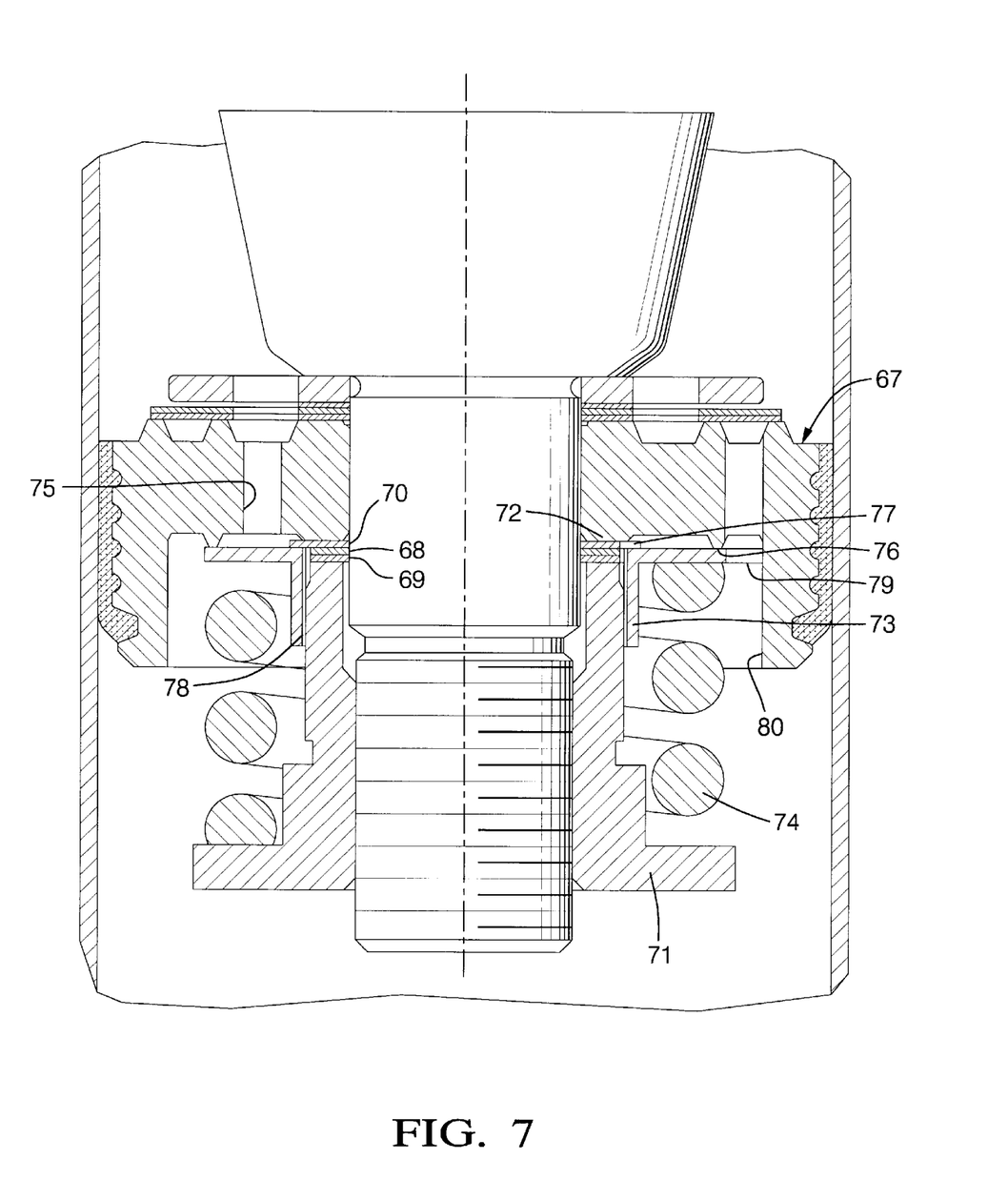
FIG. 7 is a cross-sectional illustration of a digressive damper valve according to the present invention.

Referring to FIG. 7, an alternative embodiment of the present invention is illustrated. With this embodiment the piston 67 carries two spacers 68 and 69, that along with an orifice disk 70, are captured between the nut 71 and the central hub area 72 of piston 67. Blow-off valve 73 is biased by spring 74 into engagement with the outer peripheral area of orifice disk 70 radially inside the set of rebound openings 75 and into engagement with annular seat 76 radially outside the set of rebound openings 75. The orifice disk 70 includes a plurality of orifices, representative of which is orifice 77, that are formed in the outer peripheral area of the orifice disk 70. During rebound directed travel of the piston 67, when fluid pressure created in the set of rebound openings 75 is insufficient to overcome the preload of spring 74 and unseat the blow-off valve 73, fluid flow through the set of rebound openings 75 is still possible. In this situation a restricted amount of fluid flow is provided through the set of rebound openings 75, the orifices 77 and the annular space 78 that exists between the blow-off valve 73 and the nut 71. Providing the orifice disk 70 in the rebound flow circuit facilitates low speed tuning of the piston 67. The centering feature of the blow-off valve 73 is also integrated into the blow-off valve itself rather than being provided in the piston 67. Blow-off valve 73 includes a plurality of radially directed arms designated as guides 79 that extend outward in the cavity 80 for engaging the piston 67 and maintaining the blow-off valve 73 in a substantially centered position.

Figure 8:
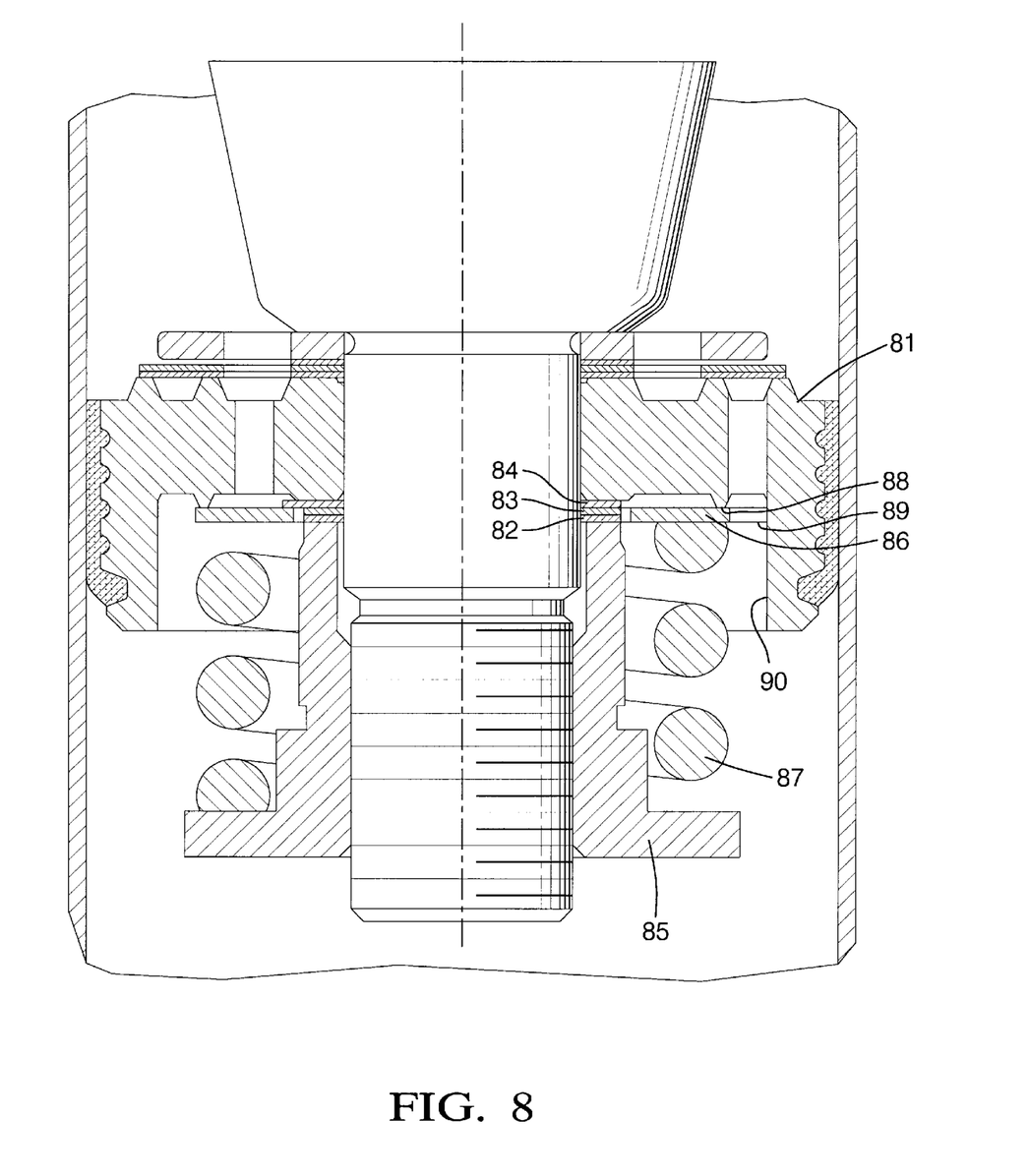
FIG. 8 is a cross-sectional illustration of a digressive damper valve according to the present invention.

Referring to FIG. 8, another embodiment of the present invention is illustrated wherein the piston 81 carries a pair of spacers 82 and 83 along with an orifice disk 84 between the nut 85 and the piston 81. The blow-off valve 86 is provided as an annular disk that is biased under the preload of spring 87 against the outer peripheral area of orifice disk 84 and annular seat 88. The blow-off valve 86 includes a plurality of radially extending arms designated as guides 89 that extend outward in the cavity 90 for engaging the piston 81 and maintaining the blow-off valve 86 in a substantially centered position during operation of the piston 81. This embodiment also facilitates low speed tuning through inclusion of the orifice disk 84.

Figure 9:
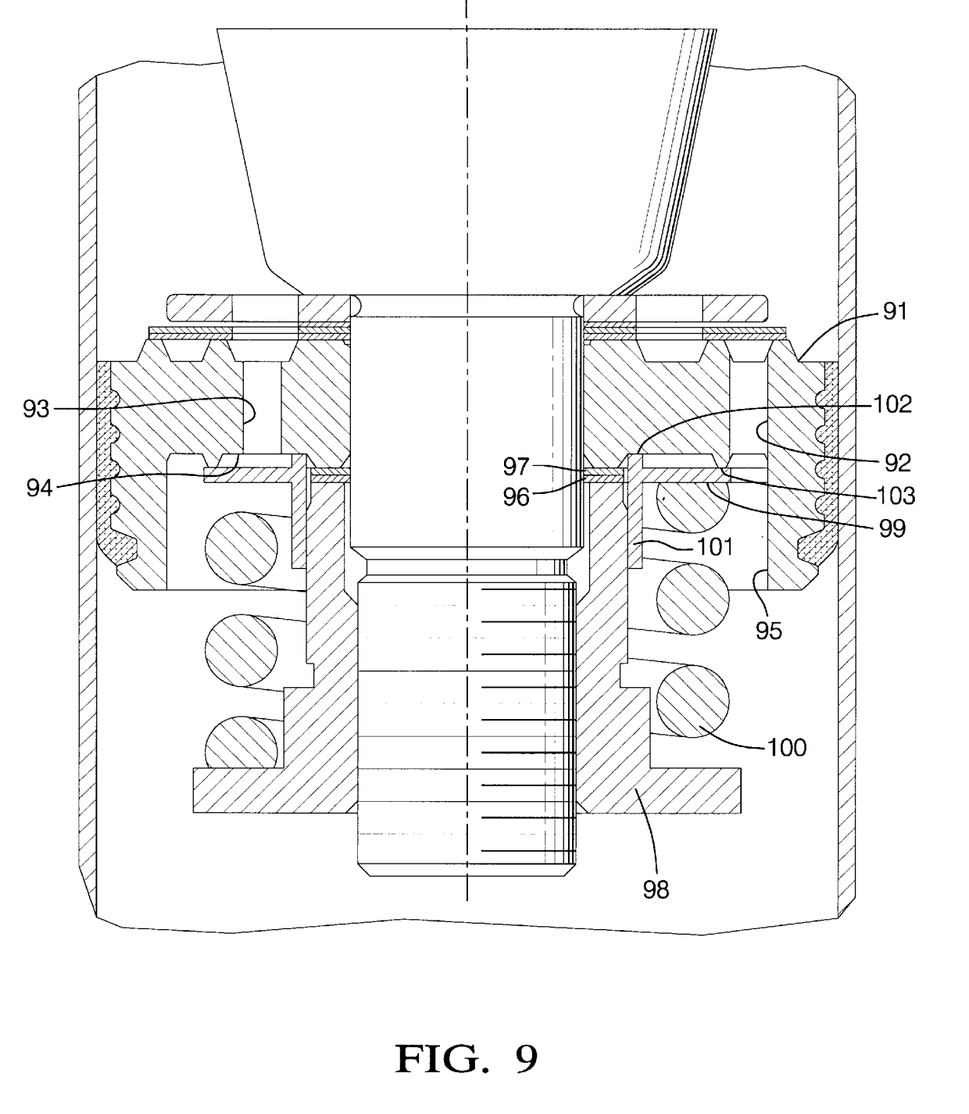
FIG. 9 is a cross-sectional illustration of a digressive damper valve according to the present invention.

Referring to FIG. 9, another alternative embodiment of the present invention is illustrated. The piston 91 includes a set of compression openings 92 and a set of rebound openings 93. An annular trough 94 is formed in cavity 95 of piston 91 that registers with the set of rebound openings 93. A pair of spacers 96 and 97 are captured between the piston 91 and the nut 98. Blow-off valve 99 is biased against piston 91 by the preload of spring 100. Blow-off valve 99 includes an axially directed cylindrical leg 101 with a terminal end 102 that engages the piston 91 within the annular trough 94 radially inside the set of rebound openings 93. Blow-off valve 99 also includes a radially directed annular leg 102 that extends from the cylindrical leg 101, slightly away from the terminal end 102, and that engages the annular seat 103 of piston 91 radially outside the set of rebound openings 93. Accordingly, the blow-off valve 99 seals directly against the piston 91. During operation of the piston 91 the blow-off valve 99 is guided on the nut 98 by the cylindrical leg 101.

Figure 10:
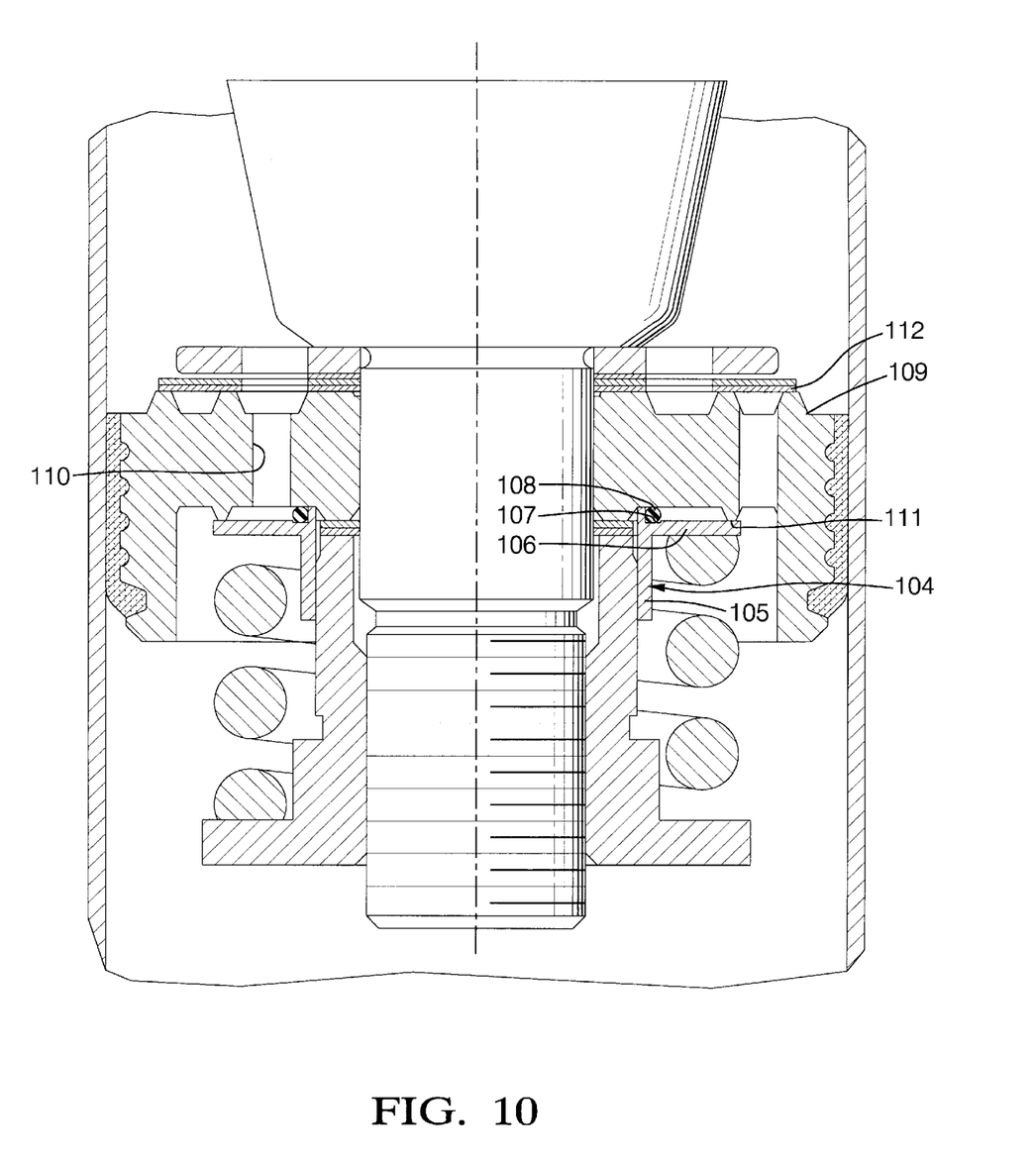
FIG. 10 is a cross-sectional illustration of a digressive damper valve according to the present invention.

Referring to FIG. 10 a modified version of the embodiment of FIG. 9 is illustrated. The blow-off valve 104 includes an axially directed cylindrical leg 105 and a radially directed annular leg 106. At the juncture between the cylindrical leg 105 and the annular leg 106 a groove 107 is formed which carries an annular resilient seal 108. The annular resilient seal 108 engages the piston 109 radially inside the set of rebound openings 110 and the annular leg 106 engages the annular seat 111 radially outside the set of rebound openings 110. Seal 108 provides a tighter closure of the set of rebound openings 110 with low speed damping during rebound operation of the piston 109 provided through the orifice disk 112.

Thus, the present invention provides a digressive damper valve with a very steep low speed performance curve and a nearly flat performance curve thereafter. This type of performance can be described as a pure blow-off response. The present invention also provides a relatively simple means of tuning the performance provided by the blow-off valve.

I claim:

1. A digressive valve for a vehicle damper providing rebound performance with a relatively high damping rate for low velocity inputs and a relatively low flow restriction operation for high velocity inputs so that a relatively firm ride with reduced impact harshness is achieved comprising:

a piston having a first surface and a second surface with an annular cavity formed in the first surface and a set of compression openings and a set of rebound openings extending through the piston from the second surface to the cavity, with an annular seat formed in the cavity;

a compression valve positioned adjacent the second surface of the piston and normally closing the set of compression orifices wherein during compression, fluid flow out from the set of compression orifices is restricted by the compression valve; and a rebound valve comprising a blow-off valve having an annular surface that tightly seals against the annular seat and having an outer peripheral surface that engages the piston within the cavity maintaining the blow-off valve in a substantially centered position with a spring having a spring rate of approximately 45 Newtons per millimeter biased against the blow-off valve and forcing the annular surface against the annular seat under a preload of over approximately 250 Newtons, wherein during rebound, fluid flow out from the set of rebound opening is restricted by the blow-off valve, wherein the annular surface and annular seat permit substantially no leakage therebetween so that the spring must be compressed to move the blow-off valve off the annular seat to allow fluid flow through the set of rebound openings, providing a firm ride under low velocity input conditions wherein the preload must be surpassed to move the blow-off valve and wherein high velocity inputs move the blow-off valve to compress the spring resulting in substantially no flow restriction so that the effects of large, high velocity inducing impacts are minimized, the piston including a plurality of axially directed guides projecting into the cavity engaging the outer peripheral surface of the blow-off valve, maintaining the blow-off valve in a substantially centered position.

2. A digressive valve for a vehicle damper providing rebound performance with a relatively high damping rate for low velocity inputs and a relatively low flow restriction operation for high velocity inputs so that a relatively firm ride with reduced impact harshness is achieved comprising:

a piston having a first surface and a second surface with an annular cavity formed in the first surface and a set of compression openings and a set of rebound openings extending through the piston from the second surface to the cavity, with an annular seat formed in the cavity;

a compression valve positioned adjacent the second surface of the piston and normally closing the set of compression orifices wherein during compression, fluid flow out from the set of compression orifices is restricted by the compression valve; and a rebound valve comprising a blow-off valve having an annular surface that tightly seals against the annular seat and having an outer peripheral surface that engages the piston within the cavity maintaining the blow-off valve in a substantially centered position with a spring having a spring rate of approximately 45 Newtons per millimeter biased against the blow-off valve and forcing the annular surface against the annular seat under a preload of over approximately 250 Newtons, wherein during rebound, fluid flow out from the set of rebound openings is restricted by the blow-off valve, wherein the annular surface and annular seat permit substantially no leakage therebetween so that the spring must be compressed to move the blow-off valve off the annular seat to allow fluid flow through the set of rebound openings, providing a firm ride under low velocity input conditions wherein the preload must be surpassed to move the blow-off valve and wherein high velocity inputs move the blow-off valve to compress the spring resulting in substantially no flow restriction so that the effects of large, high velocity inducing impacts are minimized, the annular seat being formed by the piston at a radially outside position, and by a disc at a radially inside position, wherein the disc has an outside diameter that stops radially inside the set of rebound openings, and wherein the blow-off valve includes an inner annular surface that mates with the disc radially inside the set of rebound openings and wherein the blow-off valve includes an outer annular surface that mates with the annular seat radially outside the set of rebound openings so that low velocity tuning is provided by permitting a selected amount of leakage between the disc and the inner annular surface through a series of orifices formed in the disc without compressing the spring.

3. A digressive valve for a vehicle damper providing rebound performance with a relatively high damping rate for low velocity inputs and a relatively low flow restriction operation for high velocity inputs so that a relatively firm ride with reduced impact harshness is achieved comprising:

a piston having a first surface and a second surface with an annular cavity formed in the first surface and a set of compression openings and set of rebound openings extending through the piston from the second surface to the cavity, with an annular seat formed in the cavity;

a compression valve positioned adjacent the second surface of the piston and normally closing the set of compression orifices wherein during compression, fluid flow out from the set of compression orifices is restricted by the compression valve; and a rebound valve comprising a blow-off valve having an annular surface that tightly seals against the annular seat and having an outer peripheral surface that engages the piston within the cavity maintaining the blow-off valve in a substantially centered position with a spring having a spring rate of approximately 45 Newtons per millimeter biased against the blow-off valve and forcing the annular surface against the annular seat under a preload of over approximately 250 Newtons, wherein during rebound, fluid flow out from the set of rebound openings is restricted by the blow-off valve, wherein the annular surface and annular seat permit substantially no leakage therebetween so that the spring must be compressed to move the blow-off valve off the annular seat to allow fluid flow through the set of rebound openings, providing a firm ride under low velocity input conditions wherein the preload must be surpassed to move the blow-off valve and wherein high velocity inputs move the blow-off valve to compress the spring resulting in substantially no flow restriction so that the effects of large, high velocity inducing impacts are minimized, the blow-off valve including a plurality of outwardly extending guides projecting into the cavity engaging the piston, and maintaining the blow-off valve in a substantially centered position.

4. A digressive valve for a vehicle damper providing rebound performance with a relatively high damping rate for low velocity inputs and a relatively low flow restriction operation for high velocity inputs so that a relatively firm ride with reduced impact harshness is achieved comprising:

a piston having a first surface and a second surface with an annular cavity formed in the first surface and a set of compression openings and a set of rebound openings extending through the piston from the second surface to the cavity, with an annular seat formed in the cavity;

a compression valve positioned adjacent the second surface of the piston and normally closing the set of compression orifices wherein during compression, fluid flow out from the set of compression orifices is restricted by the compression valve; and a rebound valve comprising a blow-off valve having an annular surface that tightly seals against the annular seat and having an outer peripheral surface that engages the piston within the cavity maintaining the blow-off valve in a substantially centered position with a spring having a spring rate of approximately 45 Newtons per millimeter biased against the blow-off valve and forcing the annular surface against the annular seat under a preload of over approximately 250 Newtons, wherein during rebound, fluid flow out from the set of rebound openings is restricted by the blow-off valve, wherein the annular surface and annular seat permit substantially no leakage therebetween so that the spring must be compressed to move the blow-off valve off the annular seat to allow fluid flow through the set of rebound openings, providing a firm ride under low velocity input conditions wherein the preload must be surpassed to move the blow-off valve and wherein high velocity inputs move the blow-off valve to compress the spring resulting in substantially no flow restriction so that the effects of large, high velocity inducing impacts are minimized, the blow-off valve including an axially directed cylindrical leg with a first terminal end and a second terminal end wherein the blow-off valve includes a radially directed annular leg that extends from the cylindrical leg between the first and the second terminal ends, and wherein the piston includes an annular trough inside the cavity that registers with the set of rebound openings, wherein the first terminal end seats against the piston inside the annular trough and the annular leg seats against the annular seat of the piston.

5. A digressive valve according to claim 4 further comprising an annular resilient seal carried by the blow-off valve against the annular leg and adjacent the first terminal end of the cylindrical leg wherein the seal is engageable with the piston inside the annular trough.

6. A digressive valve for a vehicle damper providing rebound performance with a relatively high damping rate for low velocity inputs and a relatively low flow restriction operation for high velocity inputs so that a relatively firm ride with reduced impact harshness is achieved comprising:

a piston having a first surface and a second surface with an annular cavity formed in the first surface and a set of compression openings and a set of rebound openings extending through the piston from the second surface to the cavity, with an annular seat formed in the cavity;

a compression valve positioned adjacent the second surface of the piston and normally closing the set of compression orifices, the compression valve including an orifice disk with a plurality of orifices and positioned against the second surface and a second stage disk positioned against the orifice disk wherein during compression, fluid flow out from the set of compression openings is restricted by the compression valve to flow through the plurality of orifices under a low velocity condition and wherein during high velocity compression, fluid flow out from the set of compression openings deflects both the orifice disk and the second stage disk; and a rebound valve comprising a blow-off valve having an annular surface that tightly seals against the annular seat with a spring biased against the blow-off valve and forcing the annular surface against the annular seat under a preload, wherein during rebound, fluid flow out from the set of rebound opening is restricted by the blow-off valve, wherein the annular surface and annular seat permit substantially no leakage therebetween so that the spring must be compressed to move the blow-off valve off the annular seat to allow fluid flow through the set of rebound openings, and wherein during low velocity rebound travel of the piston, fluid flows through the plurality of orifices of the orifice disk and through the set of compression openings, providing a firm ride under low velocity input conditions wherein the preload must be surpassed to move the blow-off valve and wherein high velocity inputs move the blow-off valve to compress the spring resulting in substantially no flow restriction so that the effects of large, high velocity inducing impacts are minimized, wherein the annular seat is formed by the piston and wherein the set of rebound openings extends through the piston radially inside the annular seat and wherein the piston includes a piston hub formed radially inside the set of rebound openings and wherein the blow-off valve includes an inner annular surface that mates with the piston hub radially inside the set of rebound openings and wherein the blow-off valve includes an outer annular surface that mates with the annular seat radially outside the set of rebound openings and wherein the blow-off valve includes a central surface formed on a radially directed leg located between the inner and the outer annular surfaces that forms an annular trough in the blow-off valve wherein the inner annular surface and the outer annular surface are both formed on the radially directed leg; and the piston including a plurality of axially directed guides projecting into the cavity engaging the outer peripheral surface of the blow-off valve, maintaining the blow-off valve in a substantially centered position.

7. A digressive valve for a vehicle damper providing rebound performance with a relatively high damping rate for low velocity inputs and a relatively low flow restriction operation for high velocity inputs so that a relatively firm ride with reduced impact harshness is achieved comprising:

a piston having a first surface and a second surface with an annular cavity formed in the first surface and a set of compression openings and a set of rebound openings extending through the piston from the second surface to the cavity, with an annular seat formed in the cavity;

a compression valve positioned adjacent the second surface of the piston and normally closing the set of compression orifices, the compression valve including an orifice disk with a plurality of orifices and positioned against the second surface and a second stage disk positioned against the orifice disk wherein during compression, fluid flow out from the set of compression openings is restricted by the compression valve to flow through the plurality of orifices under a low velocity condition and wherein during high velocity compression, fluid flow out from the set of compression openings deflects both the orifice disk and the second stage disk; and a rebound valve comprising a blow-off valve having an annular surface that tightly seals against the annular seat with a spring biased against the blow-off valve and forcing the annular surface against the annular seat under a preload, wherein during rebound, fluid flow out from the set of rebound openings is restricted by the blow-off valve, wherein the annular surface and annular seat permit substantially no leakage therebetween so that the spring must be compressed to move the blow-off valve off the annular seat to allow fluid flow through the set of rebound openings, and wherein during low velocity rebound travel of the piston, fluid flows through the plurality of orifices of the orifice disk and through the set of compression openings, providing a firm ride under low velocity input conditions wherein the preload must be surpassed to move the blow-off valve and wherein high velocity inputs move the blow-off valve to compress the spring resulting in substantially no flow restriction so that the effects of large, high velocity inducing impacts are minimized, wherein the annular seat is formed by the piston and wherein the set of rebound openings extends through the piston radially inside the annular seat and wherein the piston includes a piston hub formed radially inside the set of rebound openings and wherein the blow-off valve includes an inner annular surface that mates with the piston hub radially inside the set of rebound openings and wherein the blow-off valve includes an outer annular surface that mates with the annular seat radially outside the set of rebound openings and wherein the blow-off valve includes a central surface formed on a radially directed leg located between the inner and the outer annular surfaces that forms an annular trough in the blow-off valve wherein the inner annular surface and the outer annular surface are both formed on the radially directed leg; and the annular seat being formed by the piston at a radially outside position, and by a disc at a radially inside position, wherein the disc has an outside diameter that stops radially inside the set of rebound openings, and wherein the blow-off valve includes an inner annular surface that mates with the disc radially inside the set of rebound openings and wherein the blow-off valve includes an outer annular surface that mates with the annular seat radially outside the set of rebound openings so that low velocity tuning is provided by permitting a selected amount of leakage between the disc and the inner annular surface without compressing the spring through a series of orifices formed in the disc.

8. A digressive valve for a vehicle damper providing rebound performance with a relatively high damping rate for low velocity inputs and a relatively low flow restriction operation for high velocity inputs so that a relatively firm ride with reduced impact harshness is achieved comprising:

a piston having a first surface and a second surface with an annular cavity formed in the first surface and a set of compression openings and a set of rebound openings extending through the piston from the second surface to the cavity, with an annular seat formed in the cavity;

a compression valve positioned adjacent the second surface of the piston and normally closing the set of compression orifices, the compression valve including an orifice disk with a plurality of orifices and positioned against the second surface and a second stage disk positioned against the orifice disk wherein during compression, fluid flow out from the set of compression openings is restricted by the compression valve to flow through the plurality of orifices under a low velocity condition and wherein during high velocity compression, fluid flow out from the set of compression openings deflects both the orifice disk and the second stage disk; and a rebound valve comprising a blow-off valve having an annular surface that tightly seals against the annular seat with a spring biased against the blow-off valve and forcing the annular surface against the annular sent under a preload, wherein during rebound, fluid flow out from the set of rebound openings is restricted by the blow-off valve, wherein the annular surface and annular seat permit substantially no leakage therebetween so that the spring must be compressed to move the blow-off valve off the annular seat to allow fluid flow through the set of rebound openings, and wherein during low velocity rebound travel of the piston, fluid flows through the plurality of orifices of the orifice disk and through the set of compression openings, providing a firm ride under low velocity input conditions wherein the preload must be surpassed to move the blow-off valve and wherein high velocity inputs move the blow-off valve to compress the spring resulting in substantially no flow restriction so that the effects of large, high velocity inducing impacts are minimized, wherein the annular seat is formed by the piston and wherein the set of rebound openings extends through the piston radially inside the annular seat and wherein the piston includes a piston hub formed radially inside the set of rebound openings and wherein the blow-off valve includes in inner annular surface that mates with the piston hub radially inside the set of rebound openings and wherein the blow-off valve includes an outer annular surface that mates with the annular seat radially outside the set of rebound openings and wherein the blow-off valve includes a central surface formed on a radially directed leg located between the inner and the outer annular surfaces that forms an annular trough in the blow-off valve wherein the inner angular surface and the outer annular surface are both formed on the radially directed leg; and the blow-off valve including a plurality of radially outwardly extending guides projecting into the cavity engaging the piston, and maintaining the blow-off valve in a substantially centered position.

9. A digressive valve for a vehicle damper providing rebound performance with a relatively high damping rate for low velocity inputs and a relatively low flow restriction operation for high velocity inputs so that a relatively firm ride with reduced impact harshness is achieved comprising:

a piston having a first surface and a second surface with an annular cavity formed in the first surface and a set of compression openings and a set of rebound openings extending through the piston from the second surface to the cavity, with an annular seat formed in the cavity;

a compression valve positioned adjacent the second surface of the piston and normally closing the set of compression orifices, the compression valve including an orifice disk with a plurality of orifices and positioned against the second surface and a second stage disk positioned against the orifice disk wherein during compression, fluid flow out from the set of compression openings is restricted by the compression valve to flow through the plurality of orifices under a low velocity condition and wherein during high velocity compression, fluid flow out from the set of compression openings deflects both the orifice disk and the second stage disk; and a rebound valve comprising a blow-off valve having an annular surface that tightly seals against the annular seat with a spring biased against the blow-off valve and forcing the annular surface against the annular seat under a preload, wherein during rebound, fluid flow out from the set of rebound openings is restricted by the blow-off valve, wherein the annular surface and annular seat permit substantially no leakage therebetween so that the spring must be compressed to move the blow-off valve off the annular seat to allow fluid flow through the set of rebound openings, and wherein during low velocity rebound travel of the piston, fluid flows through the plurality of orifices of the orifice disk and through the set of compression openings, providing a firm ride under low velocity input conditions wherein the preload must be surpassed to move the blow-off valve and wherein high velocity inputs move the blow-off valve to compress the spring resulting in substantially no flow restriction so that the effects of large, high velocity inducing impacts are minimized, wherein the annular seat is formed by the piston and wherein the set of rebound openings extends through the piston radially inside the annular seat and wherein the piston includes a piston hub formed radially inside the set of rebound openings and wherein the blow-off valve includes an inner annular surface that mates with the piston hub radially inside the set of rebound openings and wherein the blow-off valve includes an outer annular surface that mates with the annular seat radially outside the set of rebound openings and wherein the blow-off valve includes a central surface formed on a radially directed leg located between the inner the outer annular surfaces that forms an annular trough in the blow-off valve wherein the inner annular surface and the outer annular surface are both formed on the radially directed leg; and the blow-off valve including an axially directed cylindrical leg with a first terminal end and a second terminal end wherein the blow-off valve includes a radially directed annular leg that extends from the cylindrical leg between the first and the second terminal ends, and wherein the piston includes an annular trough inside the cavity that registers with the set of rebound openings, wherein the first terminal end seats against the piston inside the annular trough and the annular leg seats against the annular seat of the piston.

10. A digressive valve according to claim 9 further comprising an annular resilient seal carried by the blow-off valve against the annular leg and adjacent the first terminal end of the cylindrical leg wherein the seal is engageable with the piston inside the annular trough.

11. A vehicle damper with a digressive valve providing rebound performance with a relatively high damping rate for low velocity inputs and a relatively low flow restriction operation for high velocity inputs so that a relatively firm ride with reduced impact harshness is achieved comprising:

a cylinder tube;

a piston rod extending into the cylinder tube;

a piston slidably disposed in the cylinder tube and connected to the piston rod, the piston having a first surface and a second surface with an annular cavity formed in the first surface and a set of compression openings and a set of rebound openings extending through the piston from the second surface to the cavity, with an annular seat formed in the cavity;

a compression valve positioned adjacent the second surface of the piston and normally closing the set of compression orifices, the compression valve including an orifice disk with a plurality of orifices and positioned against the second surface and a second stage disk positioned against the orifice disk wherein during compression, fluid flow out from the set of compression openings is restricted by the compression valve to flow through the plurality of orifices under a low velocity condition and wherein during high velocity compression, fluid flow out from the set of compression openings deflects both the orifice disk and the second stage disk; and a rebound valve comprising a blow-off valve having an annular surface that tightly seals against the annular seat with a spring biased against the blow-off valve and forcing the annular surface against the annular seat under a preload, wherein during rebound, fluid flow out from the set of rebound openings is restricted by the blow-off valve, wherein the annular surface and annular seat permit substantially no leakage therebetween so that the spring must be compressed to move the blow-off valve off the annular seat to allow fluid flow through the set of rebound openings, and wherein during low velocity rebound travel of the piston, fluid flows through the plurality of orifices of the orifice disk and through the set of compression openings, providing a firm ride under low velocity input conditions wherein the preload must be surpassed to move the blow-off valve and wherein high velocity inputs move the blow-off valve to compress the spring at least three millimeters resulting in substantially no flow restriction so that the effects of large, high velocity inducing impacts are minimized, the piston including a plurality of axially directed guides projecting into the cavity engaging the outer peripheral surface of the blow-off valve, maintaining the blow-off valve in a substantially centered position.

12. A vehicle damper with a digressive valve providing rebound performance with a relatively high damping rate for low velocity inputs and a relatively low flow restriction operation for high velocity inputs so that a relatively firm ride with reduced impact harshness is achieved comprising:

a cylinder tube;

a piston rod extending into the cylinder tube;

a piston slidably disposed in the cylinder tube and connected to the piston rod, the piston having a first surface and a second surface with annular cavity formed in the first surface and a set of compression openings and a set of rebound openings extending through the piston from the second surface to the cavity, with an annular seat formed in the cavity;

a compression valve positioned adjacent the second surface of the piston and normally closing the set of compression orifices, the compression valve including an orifice disk with a plurality of orifices and positioned against the second surface and a second stage disk positioned against the orifice disk wherein during compression, fluid flow out from the set compression openings is restricted by the compression valve to flow through the plurality of orifices under a low velocity condition and wherein during high velocity compression, fluid flow out from the set of compression openings deflects both the orifice disk and the second stage disk; and a rebound valve comprising a blow-off valve having an annular surface that tightly seals against the annular seat with a spring biased against the blow-off valve and forcing the annular surface against the annular seat under a preload, wherein during rebound, fluid flow out from the set of rebound openings is restricted by the blow-off valve, wherein the annular surface and annular seat permit substantially no leakage therebetween so that the spring must be compressed to move the blow-off valve off the annular seat to allow fluid flow through the set of rebound openings, and wherein during low velocity rebound travel of the piston, fluid flows through the plurality of orifices of the orifice disk and through the set of compression openings, providing a firm ride under low velocity input conditions wherein the preload must be surpassed to move the blow-off valve and wherein high velocity inputs move the blow-off valve to compress the spring at least three millimeters resulting in substantially no flow restriction so that the effects of large, high velocity inducing impacts are minimized, the annular seat being formed by the piston at a radially outside position, and by a disc at a radially inside position, wherein the disc has an outside diameter that stops radially inside the set of rebound openings, and wherein the blow-off valve includes an inner annular surface that mates with the disc radially inside the set of rebound openings and wherein the blow-off valve includes an outer annular surface that mates with the annular seat radially outside the set of rebound openings so that low velocity tuning is provided by permitting a selected amount of leakage between the disc and the inner annular surface through a series of orifices formed in the disc without compressing the spring.

13. A vehicle damper with a digressive valve providing rebound performance with a relatively high damping rate for low velocity inputs and a relatively low flow restriction operation for high velocity inputs so that a relatively firm ride with reduced impact harshness is achieved comprising:

a cylinder tube;

a piston rod extending into the cylinder tube;

a piston slidably disposed in the cylinder tube and connected to the piston rod, the piston having a first surface and a second surface with an annular cavity formed in the first surface and a set of compression openings and a set of rebound openings extending through the piston from the second surface to the cavity, with an annular seat formed in the cavity;

a compression valve positioned adjacent the second surface of the piston and normally closing the set of compression orifices, the compression valve including an orifice disk with a plurality of orifices and positioned against the second surface and a second stage disk positioned against the orifice disk wherein during compression, fluid flow out from the set of compression openings is restricted by the compression valve to flow through the plurality of orifices under a low velocity condition and wherein during high velocity compression, fluid flow out from the set of compression openings deflects both the orifice disk and the second stage disk; and a rebound valve comprising a blow-off valve having an annular surface that tightly seals against the annular seat with a spring biased against the blow-off valve and forcing the annular surface against the annular seat under a preload, wherein during rebound, fluid flow out from the set of rebound openings is restricted by the blow-off valve, wherein the annular surface and annular seat permit substantially no leakage therebetween so that the spring must be compressed to move the blow-off valve off the annular seat to allow fluid flow through the set of rebound openings, and wherein during low velocity rebound travel of the piston, fluid flows through the plurality of orifices of the orifice disk and though the set of compression openings, providing a firm ride under low velocity input conditions wherein the preload must be surpassed to move the blow-off valve and wherein high velocity inputs move the blow-off valve to compress the spring at least three millimeters resulting in substantially no flow restriction so that the effects of large, high velocity inducing impacts are minimized, the blow-off valve including a plurality of radially outwardly extending guides projecting into the cavity engaging the pistons and maintaining the blow-off valve in a substantially centered position.

14. A vehicle damper with a digressive valve providing rebound performance with a relatively high damping rate for low velocity inputs and a relatively low flow restriction operation for high velocity inputs so that a relatively firm ride with reduced impact harshness is achieved comprising:

a cylinder tube;

a piston rod extending into the cylinder tube;

a piston slidably disposed in the cylinder tube and connected to the piston rod, the piston having a first surface and a second surface with an annular cavity formed in the first surface and a set of compression openings and a set of rebound openings extending through the piston from the second surface to the cavity, with an annular seat formed in the cavity;

a compression valve positioned adjacent the second surface of the piston and normally closing the set of compression orifices, the compression valve including an orifice disk with a plurality of orifices and positioned against the second surface and a second stage disk positioned against the orifice disk wherein during compression, fluid flow out from the set of compression openings is restricted by the compression valve to flow through the plurality of orifices under a low velocity condition and wherein during high velocity compression, fluid flow out from the set of compression openings deflects both the orifice disk and the second stage disk; and a rebound valve comprising a blow-off valve having an annular surface that tightly seals against the annular seat with a spring biased against the blow-off valve and forcing the annular surface against the annular seat under a preload, wherein during rebound, fluid flow out from the set of rebound openings is restricted by the blow-off valve, wherein the annular surface and annular seat permit substantially no leakage therebetween so that the spring must be compressed to move the blow-off valve off the annular seat to allow fluid flow through the set of rebound openings, and wherein during low velocity rebound travel of the piston, fluid flows through the plurality of orifices of the orifice disk and through the set of compression openings, providing a firm ride under low velocity input conditions wherein the preload must be surpassed to move the blow-off valve and wherein high velocity inputs move the blow-off valve to compress the spring at least three millimeters resulting in substantially no flow restriction so that the effects of large, high velocity inducing impacts are minimized, the blow-off valve including an axially directed cylindrical leg with a first terminal end and a second terminal end wherein the blow-off valve includes a radially directed annular leg that extends from the cylindrical leg between the first and the second terminal ends, and wherein the piston includes an annular trough inside the cavity that registers with the set of rebound openings, wherein the first terminal end seats against the piston inside the annular trough and the annular leg seats against the annular seat of the piston.

* * * * *